H. HESS.
ROLLER BEARING.
APPLICATION FILED FEB. 13, 1909.
1,096,530.
Patented May 12, 1914.
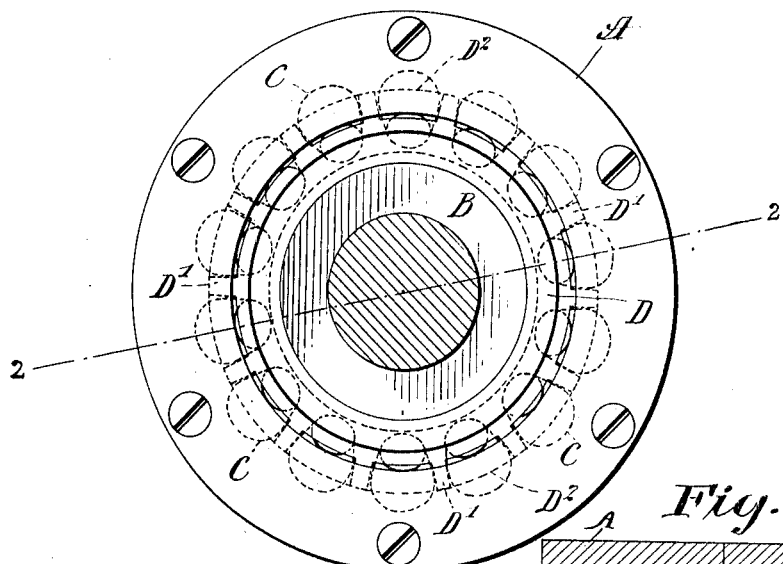
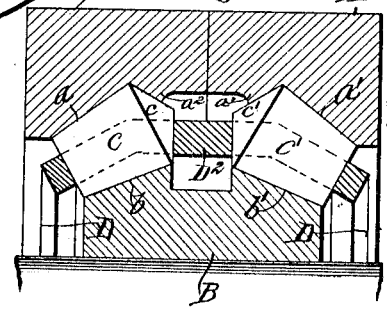
Witnesses:
Inventor
HENRY HESS
By his Attorneys

UNITED STATES PATENT OFFICE.

HENRY HESS, OF WAWA, PENNSYLVANIA, ASSIGNOR TO THE HESS-BRIGHT MANUFACTURING COMPANY, OF PHILADELPHIA, PENNSYLVANIA, A CORPORATION OF DELAWARE.

ROLLER-BEARING.

1,096,530. Specification of Letters Patent. Patented May 12, 1914.

Application filed February 13, 1909. Serial No. 477,737.

*To all whom it may concern:*

Be it known that I, HENRY HESS, a citizen of the United States, residing at Wawa, in the county of Delaware and State of Pennsylvania, have invented certain new and useful Improvements in Roller-Bearings, of which the following is a specification, reference being had therein to the accompanying drawing.

My invention relates to roller bearings, and more particularly to that class thereof designed also to sustain or transmit end thrust from the connected parts. In the present case it is shown as applied to bearings of a type known in the art and illustrated for instance in the U. S. Letters Patent to C. S. Lockwood, No. 813,905, February 27th, 1906. In the Letters Patent mentioned, the rollers are of the well known conical form and are provided at their ends with angularly-inclined crowns or apices, which latter are designed to sustain or transmit the end thrust. The rollers are arranged in double series and so that the crowns or apices of one series abut and roll in contact with the crowns or apices of the other series. In practice, due to slight irregularities in the shape or size of the rollers or of the raceway wherein they travel, such irregularities arising either from defects in original construction or from subsequent wear, it often happens that the exact alinement of the rollers is lost, and consequently that the friction and resistance in the bearing is largely increased thereby, and that the durability and life of the parts are further impaired. In the Letters Patent mentioned, a cage is employed to guide the rolls and to hold their abutting ends in proper contact.

It is the purpose of my invention to obviate the disadvantages involved, and to prevent entirely the end contact of the rolls, and to this end I provide the cage with a portion or element interposed between the ends of the respective sets of rollers and in addition provide one or the other of the casing members with abutments for the ends of the rollers, so that the end thrust thereof is borne or transmitted partly by the interposed cage element and partly by the casing member.

I have shown my invention as applied to a type of bearing illustrating it in a preferred form, but it is to be understood that I do not confine my invention to this particular type, and obviously other forms may be devised to effect the same result. Thus, the rollers may be conical or cylindrical; they may be angularly arranged or not; and the ends thereof may be angularly inclined in any desired manner, either as cones, or the frusta of cones, or as sections of spheres, or otherwise.

Generally speaking, I desire it to be understood that my invention is not limited to any specific form or arrangement of parts, except in so far as such limitations are specified in the claims.

Referring to the drawings: Figure 1 is a side view of a bearing embodying my invention; Fig. 2 is a transverse sectional view thereof.

Referring to the drawings, the bearing is shown as composed of two outer casing members A and $A^1$, and an inner casing member B. The outer casing elements A and $A^1$ are formed respectively with inclined surfaces $a$ and $a^1$, and the inner casing member B with inclined surfaces $b$ and $b^1$, between which surfaces the conical rollers C and $C^1$ are received and held in angular relations, all in the customary manner and so as to provide anti-frictional support for the radial pressure upon the bearing. The rollers C and $C^1$ also have angularly inclined or conically formed crowns or ends $c$ and $c^1$, which are designed to take the end thrust. The rollers C and $C^1$ are held in proper position by means of a cage D provided with separating arms $D^1$, $D^1$, which are located longitudinally between the respective rollers at suitable intervals for the purpose mentioned. The cage D is also provided with a transverse portion or element $D^2$, which is interposed between the lower portions of the ends $c$ and $c^1$ of the respective sets of rollers C and $C^1$, as shown in Fig. 2. The ends of the rollers roll and abut against the element $D^2$, which thus serves to resist or transmit the end thrust of the rollers from one set thereof to the other. I thus avoid the direct impingement of the roller ends against each other, together with the defects and objections arising in such arrangement.

In addition I provide the outer casing member sections A and $A^1$ with abutting surfaces $a^2$, $a^3$, with which the upper portions of the ends of the rollers contact, whereby the end thrust is borne or transmitted partly by the interposed cage element $D^2$ and partly by the casing member. The main advantage of this arrangement is that the inward thrusts are partly taken up by abutments formed in the same member applying the thrusts, and there is, therefore, no tendency of the end thrusts to separate the casing members. These and many other variations will suggest themselves to those skilled in the art and as before stated I do not limit myself to the exact embodiment of the invention shown, which I have illustrated only in preferred form, as many equivalents are clearly comprised within its scope.

Having thus described my invention, its construction and mode of operation, what I claim and desire to secure by Letters Patent of the United States is as follows:

1. In a roller bearing, the combination of casing members and two sets of rollers interposed therebetween with a cage therefor, the said cage being provided with a portion or element interposed between the ends of the respective sets of rollers, and one of the casing members being formed with abutments for the ends of the rollers, so that the end thrust thereof is received partly by the interposed cage element and partly by the casing member.

2. In a roller bearing, the combination of casing members and two sets of rollers interposed therebetween and formed with angularly-inclined ends, together with a cage therefor, the said cage being provided with a portion or abutment interposed between the ends of the respective sets of rollers, and one of the casing members being formed with abutments for the ends of the rollers, so that the end thrust thereof is received partly by the interposed cage element and partly by the casing member.

In testimony whereof I have affixed my signature in presence of two witnesses.

HENRY HESS.

Witnesses:
NETTIE L. HAHN,
MARY McCALLA.